United States Patent
Ramanujam

(10) Patent No.: US 9,805,605 B2
(45) Date of Patent: Oct. 31, 2017

(54) USING AUTONOMOUS VEHICLES IN A TAXI SERVICE

(71) Applicant: Madhusoodhan Ramanujam, Salt Lake City, UT (US)

(72) Inventor: Madhusoodhan Ramanujam, Salt Lake City, UT (US)

( * ) Notice: Subject to any disclaimer, the term of this patent is extended or adjusted under 35 U.S.C. 154(b) by 117 days.

(21) Appl. No.: 14/824,088

(22) Filed: Aug. 12, 2015

(65) Prior Publication Data

US 2015/0339928 A1   Nov. 26, 2015

(51) Int. Cl.
   *G08G 1/00*   (2006.01)
   *G06Q 10/00*   (2012.01)

(52) U.S. Cl.
   CPC ............. *G08G 1/202* (2013.01); *G06Q 10/00* (2013.01)

(58) Field of Classification Search
   CPC ....... G06Q 50/265; G06Q 10/00; H04W 4/02; H04W 4/021; H04W 4/22; G08G 1/202
   USPC ........... 701/23; 348/14.02, 14.16; 455/404.2, 455/456.1, 456.3
   See application file for complete search history.

(56) References Cited

U.S. PATENT DOCUMENTS

| | | | |
|---|---|---|---|
| 8,078,349 B1 | 12/2011 | Prada Gomez | |
| 9,494,938 B1 * | 11/2016 | Kemler | G05D 1/0088 |
| 2009/0125174 A1 * | 5/2009 | Delean | G08G 1/202 |
| | | | 701/24 |
| 2012/0083959 A1 | 4/2012 | Dolgov | |
| 2012/0083960 A1 | 4/2012 | Zhu | |
| 2013/0231824 A1 * | 9/2013 | Wilson | G05D 1/0246 |
| | | | 701/26 |
| 2014/0016826 A1 | 1/2014 | Fairfield | |
| 2015/0081362 A1 * | 3/2015 | Chadwick | G06Q 50/30 |
| | | | 705/7.14 |
| 2016/0247109 A1 * | 8/2016 | Scicluna | G06Q 10/06315 |
| 2016/0301698 A1 * | 10/2016 | Katara | G07B 13/02 |

* cited by examiner

*Primary Examiner* — Dalena Tran
(74) *Attorney, Agent, or Firm* — Madhusoodhan Ramanujam

(57) ABSTRACT

Technology is described for operating a fleet of autonomous vehicles. A request for a taxi service may be received from a mobile device. The request may include a current location of the mobile device. They request may indicate that the taxi service is to be performed at a current time. An autonomous vehicle may be selected from the fleet of autonomous vehicles to perform the taxi service based in part on an availability of the autonomous vehicle and a proximity between the autonomous vehicle and the current location of the mobile device. Instructions may be provided to the autonomous vehicle to perform the taxi service according to the request. The autonomous vehicle may be configured to provide commands to drive the autonomous vehicle to the current location of the mobile device in order to perform the taxi service.

18 Claims, 11 Drawing Sheets

USING AUTONOMOUS VEHICLES IN A TAXI SERVICE

BACKGROUND

Autonomous vehicles, such as self-driving cars, may operate with minimal or substantially no human input. For example, a passenger may enter a destination at a console of the autonomous vehicle, such as a touch screen, and the autonomous vehicle may navigate itself to the destination (e.g., a movie theater) by sensing its surrounding environment. The autonomous vehicle may sense its surroundings using a combination of sensors, cameras, radar, light detection and ranging (LIDAR), global positioning system (GPS), etc.

Autonomous vehicles offer a large number of benefits as compared to traditional automobiles. For example, autonomous vehicles may reduce traffic collisions due to the autonomous vehicle's increased reliability and improved reaction time as compared to human drivers. Autonomous vehicles may increase roadway capacity and reduce traffic congestion. In addition, passengers that are under age, elderly, disabled, intoxicated, or otherwise impaired may benefit from traveling in autonomous vehicles.

DETAILED DESCRIPTION

Figure 1:
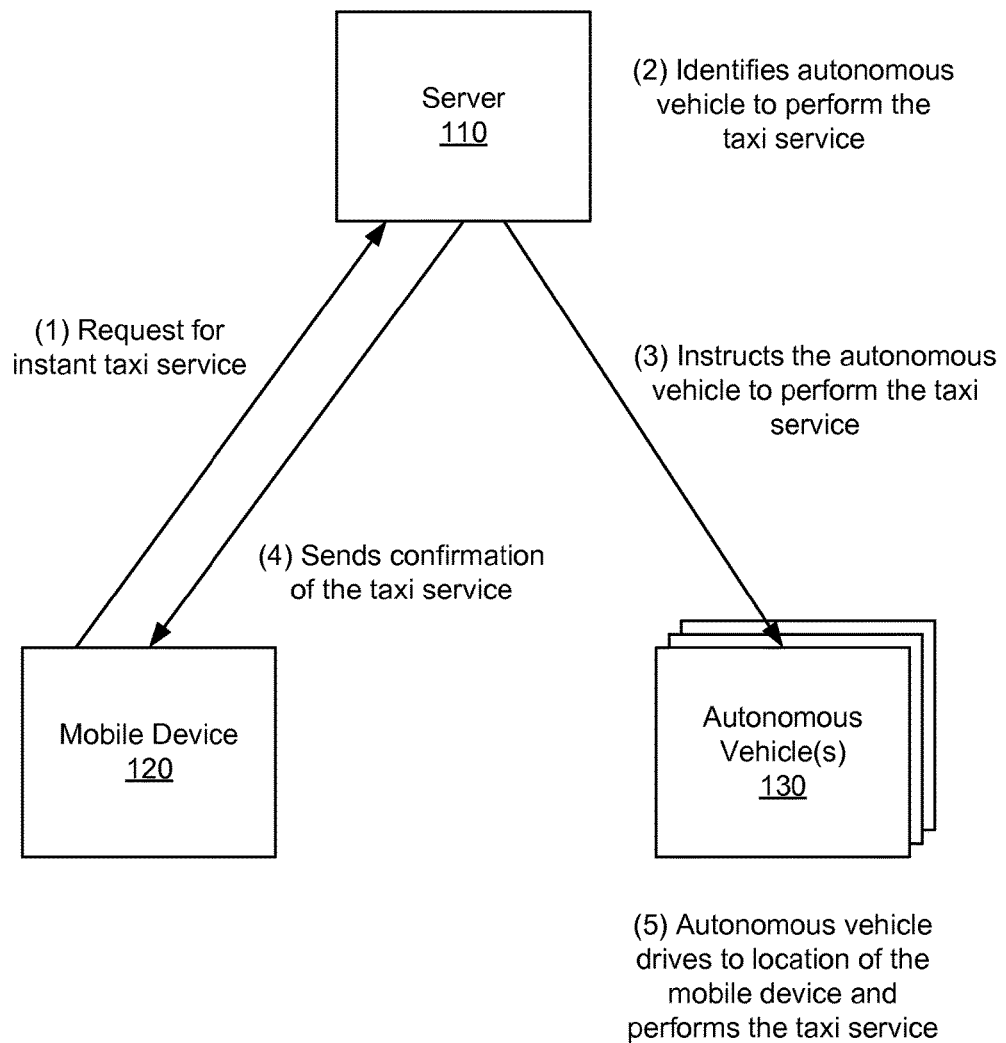
FIG. 1 illustrates a system and related operations for dispatching an autonomous vehicle to perform a taxi service according to an example of the present technology.

Technology is described for operating a plurality of autonomous vehicles as part of a taxi service. One example of an autonomous vehicle is a self-driving car or a driverless car. A user may request a taxi service using an application that is running on the user's mobile device. The taxi service may involve picking up the user at a pickup location at a selected pickup time and dropping off the user at a drop-off location. The mobile device may communicate with a taxi service control system that operates the plurality of autonomous vehicles within a defined geographical region. The taxi service request may include a pickup location, a drop-off location and a selected pickup time. In one example, the taxi service request may include other details, such as the number of passengers to ride in the autonomous vehicle, a requested vehicle type (e.g., a convertible), etc.

The taxi service control system may receive the taxi service request from the user's mobile device, and based on the taxi service request, the taxi service control system may select an autonomous vehicle from the plurality of autonomous vehicles to perform the taxi service for the user. In one example, the taxi service control system may dynamically maintain a list of autonomous vehicles that operate in the he defined geographical area. The taxi service control system may use the list of autonomous vehicle when selecting the autonomous vehicle to perform the taxi service for the user. The list of autonomous vehicles may include a current location and a taxi service schedule for each of the autonomous vehicles. In addition, the list of autonomous vehicles may indicate whether each autonomous vehicle is currently performing a taxi service or is available to perform taxi services.

In one example, the taxi service request may indicate that the selected pickup time for the taxi service is a current time. In other words, the user requests to be picked up at the pickup location as soon as possible and driven to the drop-off location. The pickup location may be a current location associated with the mobile device or a specific location defined in the taxi service request. The taxi service control system may select an autonomous vehicle that is currently available to perform the taxi service from the list of autonomous vehicles based on the autonomous vehicle's current proximity or distance to the pickup location. For example, a first available autonomous vehicle that is current located closer to the user as compared to a second available autonomous vehicle may be selected to perform the taxi service over the second available autonomous vehicle. In addition, the taxi service control system may verify, based on the selected autonomous vehicle's taxi service schedule, that the selected autonomous vehicle does not have any previously scheduled taxi services that conflict with the taxi service for the user. In one example, the taxi service control system may calculate an estimated amount of time to perform the taxi service for the user (i.e., picking up the user and dropping off the user). The taxi service control system may use the estimated amount of time to verify that the taxi service does not conflict with the previously scheduled taxi services on the taxi service schedule.

In one example, the selected pickup time for the taxi service may be an upcoming time, as opposed to a current time. For example, the current time may be 1 PM and the user requests the taxi service at 4 PM. The taxi service control system may identify an autonomous vehicle that is available at the selected pickup time from the list of autonomous vehicles. The taxi service control system may select the autonomous vehicle based on an expected location of the autonomous vehicle prior to the selected pickup time. In addition, the taxi service control system may verify that the taxi service does not conflict with previously scheduled taxi services for the autonomous vehicle.

After the autonomous vehicle is selected, the taxi service control system may schedule the autonomous vehicle to perform the taxi service for the user at the selected pickup time. In other words, the taxi service control system may instruct the selected autonomous vehicle to perform the taxi service for the user at the selected pickup time. The taxi service control system may send the pickup location (e.g., an address, geographical coordinates) and the drop-off location to the autonomous vehicle. In addition, the taxi service control system may send a confirmation to the user that requested the taxi service, via the application on the user's mobile device, indicating that the autonomous vehicle is scheduled to arrive at the pickup location at the selected time (i.e., as soon as possible or an upcoming time).

When the user requests for the taxi service to be performed immediately (i.e., as soon as possible), the selected autonomous vehicle may begin driving to the pickup location immediately after receiving the instructions from the taxi service control system. In addition, the taxi service control system may calculate an estimated amount of time for the selected autonomous vehicle to arrive at the pickup location. The taxi service control system may use real-time traffic information when calculating the estimated amount of time for the selected autonomous vehicle to arrive at the pickup location. The taxi service control system may include the estimated amount of time in the confirmation sent to the user's mobile device. The taxi service control system may also notify the user when the autonomous vehicle is near the pickup location (e.g., 2 minutes away) and/or when the autonomous vehicle has arrived at the pickup location.

When the user requests for the taxi service to be performed at an upcoming time, the autonomous vehicle selected to perform the taxi service may determine a time to begin driving from the autonomous vehicle's current location to the pickup location, such that the autonomous vehicle arrives at the pickup location at the selected pickup time. In one example, the autonomous vehicle may use real-time traffic information when determining the time to start driving to the pickup location. The autonomous vehicle may arrive at the pickup location at the selected pickup time, and send a notification to the user's mobile device indicating that the autonomous vehicle has arrived at the pickup location.

When the autonomous vehicle arrives at the pickup location, the user may be granted access to the autonomous vehicle upon providing a form of authentication. For example, the autonomous vehicle may detect that the user's mobile device is in proximity to the autonomous vehicle, and therefore, the user is presumed to be carrying the mobile device and is authorized to enter into the autonomous vehicle. As another example, the taxi service control system may provide an access code in the notification message to the user's mobile device. The user may correctly enter the access code at the autonomous vehicle (e.g., on a keypad at an outside door, on a screen inside the autonomous vehicle) in order for the autonomous vehicle to begin driving to the drop-off location.

The autonomous vehicle may select a route to drive the user from the pickup location to the drop-off location. The route may be optimized to reduce a distance traveled and/or an amount of time to perform the taxi service. The autonomous vehicle may drive from the pickup location to the drop-off location in accordance with the route. In particular, one or more processors of the autonomous vehicle may provide commands to the autonomous vehicle's actuators, thereby controlling steering, acceleration, braking and throttle of the autonomous vehicle.

In one example, the user may request for the route to be altered when the autonomous vehicle is traveling to the drop-off location. As an example, the user may request to stop at a convenience store along the route or pick up a friend on the way to the drop-off location. The request may be received at the taxi service control system. The taxi service control system may verify that the request does not conflict with previously scheduled taxi services for the autonomous vehicle, and if no conflict is found, the taxi service control system may instruct the autonomous vehicle to perform the user's request. The taxi service control system may calculate a cost associated with the taxi service. The taxi service control system, using bank account information associated with the user, may charge the user for the taxi service.

The autonomous vehicle may notify the taxi service control system when the taxi service is completed. The autonomous vehicle may perform a subsequent taxi service according to the autonomous vehicle's taxi service schedule. Alternatively, the autonomous vehicle may return to a base location (e.g., a parking garage) and wait for an upcoming taxi service (i.e., a taxi service that has already been scheduled) or until the taxi service control system instructs the autonomous vehicle to perform an additional taxi service. In one example, the autonomous vehicle may drive to a taxi company station in between taxi services for refueling/recharging, maintenance, etc.

FIG. 1 illustrates an exemplary system and related operations for dispatching an autonomous vehicle 130 to perform a taxi service. The taxi service may involve the autonomous vehicle 130 driving to a pickup location to pick up a customer at a designated time, and then driving to a drop-off location in order to drop off the customer. The autonomous vehicle 130 may be included in a fleet of autonomous vehicles 130 that provide taxi services to a plurality of customers. The fleet of autonomous vehicles 130 may be operated by a taxi service provider. The fleet of autonomous vehicles 130 may service a particular geographical area, such as a specific country, state, county, region, city, etc.

In one example, a mobile device 120 may send a taxi service request to a server 110 associated with the taxi service provider. The taxi service request may indicate that a customer associated with the mobile device 120 is requesting a taxi service from the taxi service provider. The taxi service request may include various details about the taxi service, such as a pickup location, a pickup time, a drop-off location, a drop-off time, vehicle type, etc. In one example, the taxi service request may indicate for the pickup time to be as soon as possible. In other words, the customer may request for the taxi service to be performed as soon as an autonomous vehicle 130 is available to pick up the customer at the pickup location.

The server 110 may select a particular autonomous vehicle 130 from the fleet of autonomous vehicles 130 to perform the taxi service for the customer. The autonomous vehicle 130 may be selected based on a combination of: a distance between the autonomous vehicle's current location and the pickup location, availability, features, seating capacity, etc. In addition, the server 110 may ensure that the selected autonomous vehicle 130 is not already scheduled to perform taxi services that conflict with the taxi service currently being scheduled. In other words, the server 110 may ensure that the selected autonomous vehicle 130 is free for the estimated duration of time needed to perform the taxi service for the customer.

In one example, the server 110 may instruct the selected autonomous vehicle 130 to perform the taxi service. The server 110 may send information related to the taxi service to be performed at the autonomous vehicle 130, such as the pickup location, drop-off location, etc. In addition, the server 110 may send a confirmation message to the mobile device 120 confirming that the autonomous vehicle 130 will pick up the customer at the pickup location. The server 110 may also provide an estimated amount of time (e.g., 15 minutes) for the autonomous vehicle 130 to arrive at the pickup location. The autonomous vehicle 130, after receiving the instructions from the server 110, may start driving from a current location to the pickup location in order to fulfill the taxi service request from the customer.

Figure 2A:
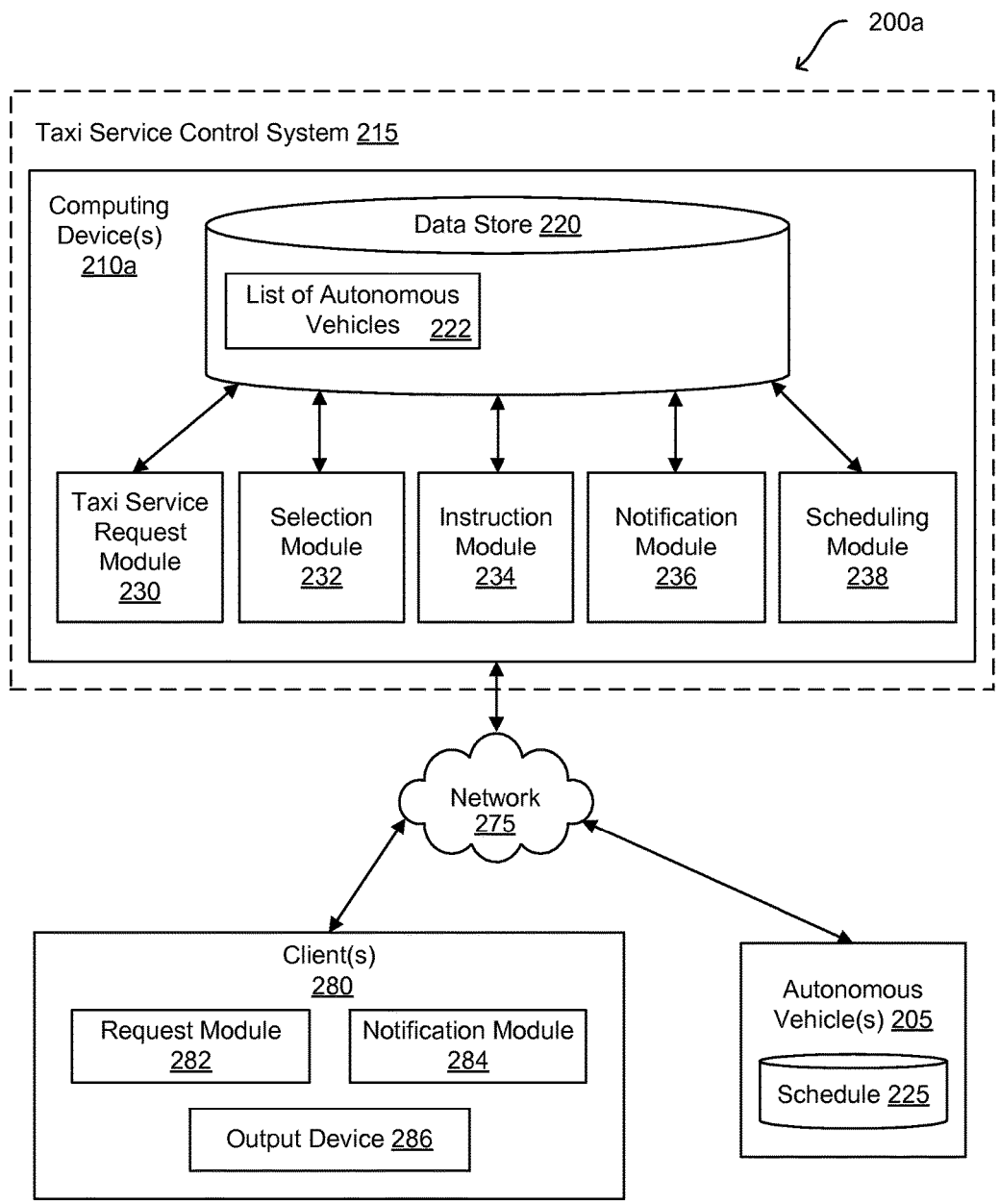
FIG. 2A is an illustration of a networked system for operating a fleet of autonomous vehicles according to an example of the present technology.

In the following discussion, a general description of an example system for operating a fleet of autonomous vehicles in a taxi service and the system's components are provided. The general description is followed by a discussion of the operation of the components in a system for the technology. FIG. 2A illustrates a networked environment 200a according to one example of the present technology. The networked environment 200a may include one or more computing devices 210a in data communication with a client 280 by way of a network 275. The network 275 may include the Internet, intranets, extranets, wide area networks (WANs), local area networks (LANs), wired networks, wireless networks, or other suitable networks, etc., or any combination of two or more such networks. In one example, the computing device 210a may be included in a taxi service control system 215. The taxi service control system 215 may be associated with a particular taxi service provider that operates and maintains a fleet of autonomous vehicles 205.

Various applications, services and/or other functionality may be executed in the computing device 210a according to varying embodiments. Also, various data may be stored in a data store 220 that is accessible to the computing device 210a. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include a list of autonomous vehicles 222. The list of autonomous vehicles 222 may include a current status of each autonomous vehicle 205 that is operated by the taxi service provider. The autonomous vehicles on the list 222 may be limited to operating within a defined geographical area. In one configuration, the list of autonomous vehicles 222 may include, for each autonomous vehicle 205 on the list, a current location of the autonomous vehicle 205 and a taxi schedule associated with that autonomous vehicle 205. The current status for each autonomous vehicle 205 on the list 222 may dynamically change as the autonomous vehicles 205 start performing taxi services and finish performing taxi services. Based on the taxi schedule, whether a particular autonomous vehicle 205 is currently performing a taxi service or is available to perform a taxi service may be determined. As a non-limiting example, the list 222 may include status information for vehicle A and vehicle B. According to the list 222, vehicle A may be at location A and is currently performing a taxi service for another 30 minutes, and vehicle B may be at location B and is currently available to perform taxi services for another two hours. The list of autonomous vehicles 222 may be used when selecting a particular autonomous vehicle 205 from the list 222 to perform a particular taxi service.

The components executed on the computing device 210a may include a taxi service request module 230, a selection module 232, an instruction module 234, a notification module 236, a scheduling module 238, and other applications, services, processes, systems, engines, or functionality not discussed in detail herein. The taxi service request module 230 may be configured to receive a taxi service request from the client 280. The client 280 may be associated with a passenger that is requesting the taxi service. The taxi service may involve picking up a passenger at a defined pickup location and dropping off the passenger at a defined drop-off location. In one example, the taxi service request may include a selected pickup time for performing the taxi service. The selected pickup time may be a current time (i.e., the passenger requests an immediate taxi service), or alternatively, the selected pickup time may be an upcoming pickup time. The taxi service request may define the pickup location to be the client's current location, or alternatively, the passenger may indicate a specific pickup location in the taxi service request. In addition, the taxi service request may include a variety of additional details about the taxi service, such as the drop-off location, a number of passengers, a preferred vehicle type, etc.

The selection module 232 may be configured to select an autonomous vehicle 205 from the fleet of autonomous vehicles 205 to perform the taxi service. In one example, the selection module 232 may select the autonomous vehicle 205 based on the autonomous vehicle's availability to perform the taxi service at the selected pickup time. In other words, autonomous vehicles with previously scheduled taxi services that conflict or coincide with the taxi service may not be selected to perform the taxi service. The selection module 232 may assess the availability of each autonomous vehicle 205 in the fleet to perform the taxi service at the selected pickup time using the list of autonomous vehicles 222. In addition, the selection module 232 may select the autonomous vehicle 205 based on the autonomous vehicle's current proximity (or expected proximity) to the pickup location at the selected pickup time. As a non-limiting example, between a first autonomous vehicle that is two miles away from the pickup location and a second autonomous vehicle that is five miles away from the pickup location, the selection module 232 may select the first autonomous vehicle to perform the taxi service. In one configuration, the selection module 232 may select the autonomous vehicle 205 based on the additional details in the taxi service request, such as the preferred vehicle type or the number of passengers. In one example, when the request is for an immediate taxi service, the selection module 232 may select an available autonomous vehicle 205 from the fleet of autonomous vehicles that is capable of driving to the pickup location in a least amount of time.

The instruction module 234 may be configured to provide instructions to the autonomous vehicle 205 that is selected from the fleet of autonomous vehicles to perform the taxi service. In other words, the instruction module 234 may provide the pickup location, a selected pickup time at which the autonomous vehicle 205 is to arrive at the pickup location, and the drop-off location. In one example, the instruction module 234 may provide a route for which the autonomous vehicle 205 is to follow when traveling from the autonomous vehicle's current location to the pickup location, and the route for which the autonomous vehicle 205 is to follow when traveling from the pickup location to the drop-off location. In one configuration, the instruction module 234 may instruct the autonomous vehicle 205 to perform a modified taxi service in accordance with an additional request from the client 280. In yet another configuration, the instruction module 234 may instruct the autonomous vehicle 205 to drive to a default parking area (e.g., a parking garage) after completing the taxi service and wait for instructions to perform an additional taxi service.

The notification module 236 may be configured to send a notification to the client 280 confirming that the autonomous vehicle 205 is scheduled to arrive at the pickup location (e.g., a current location of the client 280). In one example, when the request is for an immediate taxi service, the notification may include an estimated arrival time at the pickup location. In one example, the notification module 236 may send another notification to the client 280 after the autonomous vehicle 205 has arrived at the pickup location. The notification module 236 may send yet another notification with an updated estimated arrival time when the autonomous vehicle 205 is delayed due to road traffic.

The scheduling module 238 may be configured to add the taxi service to the autonomous vehicle's schedule 225 of taxi services to be performed. The scheduling module 238 may add the taxi service to the autonomous vehicle's schedule 225 after the autonomous vehicle 205 is selected to perform the taxi service. The taxi service may be performed immediately by the autonomous vehicle 205 or at a later time. The autonomous vehicle 205 (as well as the computing device 210a) may maintain the schedule 225 of taxi services to be performed at the autonomous vehicle 205. The autonomous vehicle 205 may perform the taxi services in accordance with the schedule 225. The scheduling module 238 may dynamically update the autonomous vehicle's schedule 225 of taxi services to perform based on incoming taxi service requests. In other words, the scheduling module 238 may dynamically add, delete or modify the taxi services on the autonomous vehicle's schedule 225 based on the incoming taxi service requests.

Figure 2B:
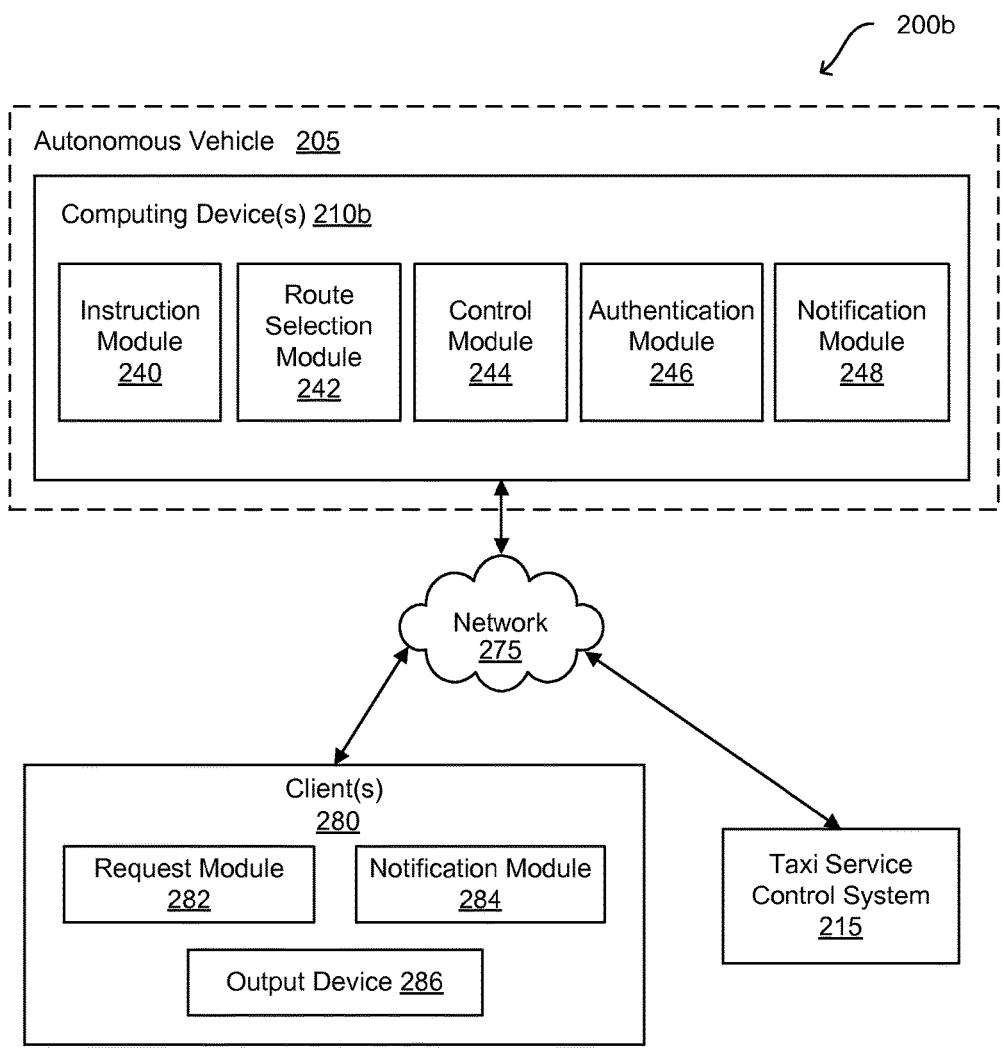
FIG. 2B is an illustration of a networked system for performing taxi services according to an example of the present technology.

In the following discussion, a general description of an example system for performing taxi services and the system's components are provided. The general description is followed by a discussion of the operation of the components in a system for the technology. FIG. 2B illustrates a networked environment 200b according to one example of the present technology. The networked environment 200b may include one or more computing devices 210b in data communication with the client 280 by way of the network 275. In one example, the computing device 210b may be included in the autonomous vehicle 205.

The components executed on the computing device 210b may include an instruction module 240, a route selection module 242, a control module 244, an authentication module 246, a notification module 248, and other applications, services, processes, systems, engines, or functionality not discussed in detail herein. The instruction module 240 may be configured to receive instructions from a taxi service control system 215. The instructions may be for performing a taxi service in accordance with the taxi service request received from the client 280. The instructions may include a pickup location, a selected pickup time at which the autonomous vehicle 205 is to arrive at the pickup location, and a drop-off location. In one example, the pickup location and the drop-off location may be described by an address, geographical coordinates, etc. The selected pickup time may be defined to be as soon as possible, or alternatively, the selected pickup time may be defined as a later time.

The route selection module 242 may be configured to determine one or more routes for performing the taxi service. For example, the route selection module 242 may determine a route for which the autonomous vehicle 205 is to follow when traveling from the autonomous vehicle's current location to the pickup location. In addition, the route selection module 242 may determine a route for which the autonomous vehicle 205 is to follow when traveling from the pickup location to the drop-off location. In one example, the route selection module 242 may use traffic information, distance information, estimated travel times, etc. when determining the routes for the taxi service.

The control module 244 may be configured to provide commands to drive the autonomous vehicle 205 from the autonomous vehicle's current location to the pickup location according to the selected route in order to perform the taxi service. In particular, the control module 244 may provide commands to the autonomous vehicle's actuators, thereby controlling steering, acceleration, braking and throttle of the autonomous vehicle 205. In addition, the control module 244 may provide commands to drive the autonomous vehicle 205 from the pickup location to the drop-off location. After the autonomous vehicle 205 drops off the passenger at the drop-off location, the control module 244 may provide commands to drive the autonomous vehicle 205 from the drop-off location to another pickup location to perform a subsequent taxi service, or alternatively, the control module 244 may provide commands to drive to autonomous vehicle 205 to a default location until the subsequent taxi service is ready to be performed.

The authentication module 246 may be configured to authenticate the passenger at the pickup location before permitting the passenger to enter into the autonomous vehicle 205. In other words, the authentication module 246 may verify that the passenger at the pickup location submitted the taxi service request and is authorized to enter into the autonomous vehicle 205. In one example, the authentication module 246 may detect that the client 280 is in proximity to the autonomous vehicle 205, and therefore, the passenger is presumed to be carrying the client 280 and is authorized to enter into the autonomous vehicle 205. As another example, the taxi service control system 215 may provide the authentication code to the client 280 when the taxi service is successfully arranged for the passenger. The passenger may provide the authentication code to the autonomous vehicle 205 after the autonomous vehicle 205 arrives at the pickup location. For example, the authentication code may be provided on a keypad at an outside door of the autonomous vehicle 205 or on a user interface inside the autonomous vehicle 205. The authentication module 246 may verify the authentication code, and upon a successful verification, the autonomous vehicle 205 may start performing the taxi service.

The notification module 248 may be configured to notify the taxi service control system 215 after instructions to perform a taxi service are successfully received from the taxi service control system 215. In addition, the notification module 248 may notify the taxi service controls system 215 after the taxi service has been completed and the autonomous vehicle 205 is ready to perform additional taxi services. In one configuration, the notification module 248 may send a notification to the client 280 after the autonomous vehicle 205 has arrived at the pickup location.

Certain processing modules may be discussed in connection with this technology and FIGS. 2A-2B. In one example configuration, a module of FIGS. 2A-2B may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

As shown in FIGS. 2A-2B, the computing device 210a-b may comprise, for example, a server computer or any other system providing computing capability. For purposes of convenience, the computing device 210a-b is referred to herein in the singular. Even though the computing device 210a-b is referred to in the singular, it is understood that a plurality of computing devices 210a-b may be employed.

As shown in FIGS. 2A-2B, the client 280 may be representative of a plurality of client devices that may be coupled to the network 275. The client 280 may comprise, for example, a processor-based system such as a computer system. Such a computer system may be embodied in the form of a laptop computer, personal digital assistants, cellular telephones, smartphones, tablet computer systems, or other devices with like capability.

The client 280 may include a request module 282 configured to send a taxi service request to the taxi service control system 215. The taxi service request may include a selected pickup time. In one example, the selected pickup time may be a current time (i.e., the passenger requests an immediate taxi service), or alternatively, the selected pickup time may be an upcoming time. The taxi service request may include the pickup location. In one example, the pickup location may be the client's current location, or alternatively, the pickup location may be a specific location defined by the passenger in the taxi service request.

The client 280 may include a notification module 284 configured to receive notifications from the autonomous vehicle 205 and/or the taxi service control system 215. For example, the notification module 284 may receive a confirmation that the autonomous vehicle 205 is to arrive at the pickup location at the selected pickup time. The notification module 284 may receive a notification when the autonomous vehicle 205 has arrived at the pickup location. In addition, the notification module 284 may receive an additional notification with an updated estimated arrival time when the autonomous vehicle 205 is delayed due to road traffic or other reasons.

The client 280 may include or be coupled to an output device 286. The output device 286 may comprise, for example, one or more devices such as cathode ray tubes (CRTs), liquid crystal display (LCD) screens, gas plasma-based flat panel displays, LCD projectors, or other types of display devices, etc.

Figure 3:
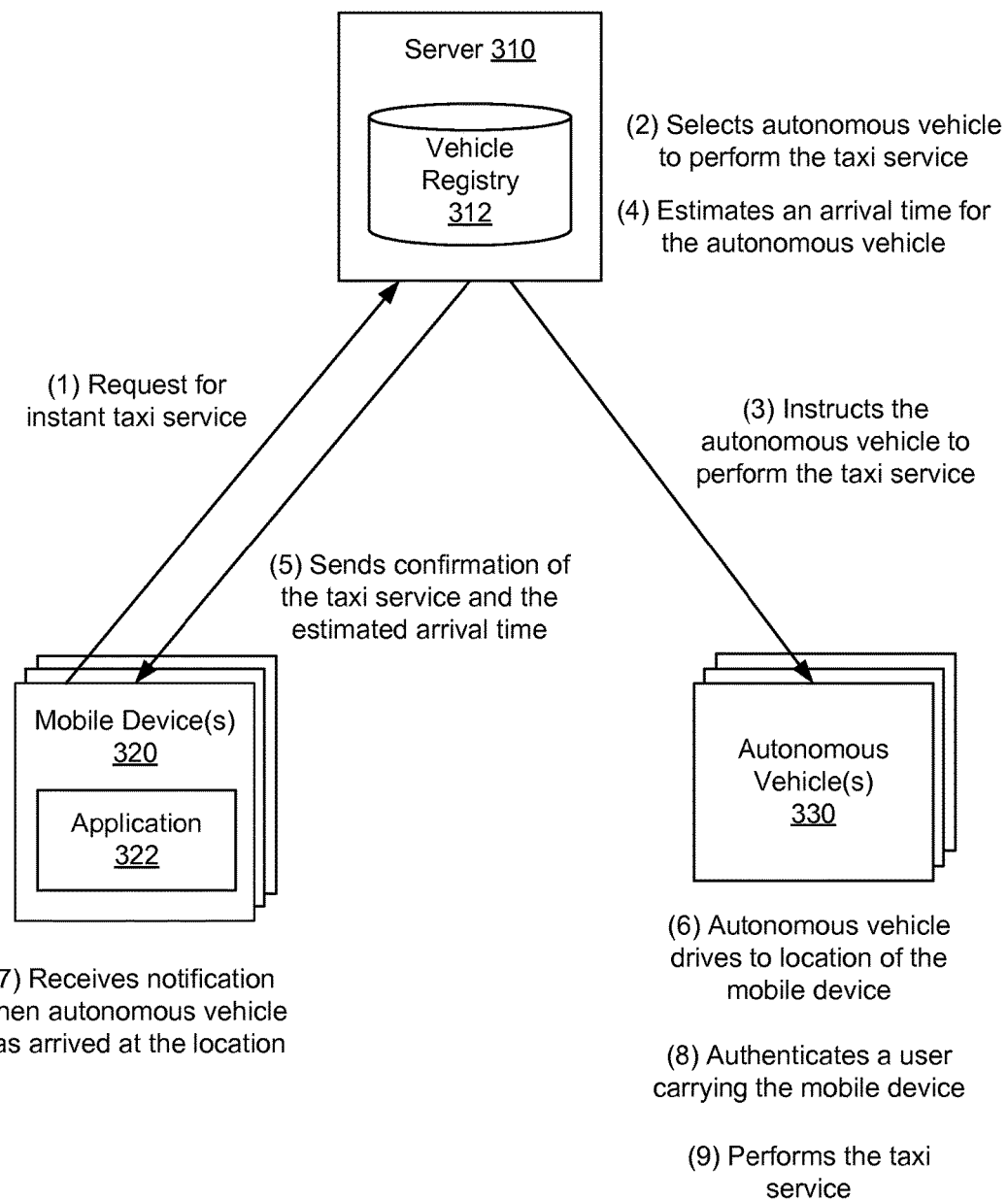
FIG. 3 illustrates a system and related operations for dispatching an autonomous vehicle to perform a taxi service according to an example of the present technology.

FIG. 3 illustrates an exemplary system and related operations for dispatching an autonomous vehicle 330 to perform a taxi service. The autonomous vehicle 330 may be included in a fleet of autonomous vehicles 330 that provide taxi services to a plurality of customers. The fleet of autonomous vehicles 330 may service a particular geographical area, such as a specific country, state, county, region, city, etc. The fleet of autonomous vehicles 330 may be controlled by a taxi service provider via a server 310. In other words, the server 310 may receive taxi service requests from customers, and select autonomous vehicles 330 to perform the taxi services. The taxi service may involve the autonomous vehicle 330 driving to a pickup location to pick up a customer at a selected pickup time, and then driving to a drop-off location to drop off the customer.

In one configuration, the customer may send taxi service requests to the server 310 using an application 322 that is executing on a mobile device 320. The customer may download and install the application 322 on the mobile device 320. In one example, the customer may register with the server 310 upon installation of the application 322 on the mobile device 320, during which time the customer may provide personal information (e.g., name, age, home address, bank information) to the server 310. After completion of the registration process, the customer may send taxi service request to the server 310 via the application 322 that is executing on the mobile device 320. The customer may send the taxi service request to the server 310 in order to request a taxi service from the taxi service provider.

The taxi service request may include a number of details about the taxi service requested from the customer. In one example, the taxi service request communicated from the mobile device 320 to the server 310 may include a selected pickup time. In one example, the taxi service request may define the pickup time to be a current time. In other words, the customer may request for the taxi service to be performed as soon as possible.

In one example, the taxi service request communicated from the mobile device 320 to the server 310 may include a pickup location. The mobile device 320 may include an address or geographical coordinates associated with the pickup location in the taxi service request. Alternatively, the taxi service request may include a name of a venue (e.g., a movie theater, a sports arena, a restaurant), and the server 310 may determine the address of the venue in order to obtain the pickup location. In one configuration, the mobile device 320 may determine its current location (e.g., using GPS), and then indicate to the server 310 that the mobile device's current location is the pickup location. In other words, the pickup location included in the taxi service request may be the current location of the mobile device 320.

In one example, the taxi service request communicated from the mobile device 320 to the server 310 may include a drop-off location. The mobile device 320 may include the address of geographical coordinates associated with the drop-off location in the taxi service request. Alternatively, the taxi service request may include a name of the destination, and the server 310 may determine the address of the destination in order to obtain the drop-off location.

In one example, the taxi service request communicated from the mobile device 320 to the server 310 may include additional information or other customer requests. For example, the taxi service request may indicate a number of passengers that are to ride in the autonomous vehicle 330. The taxi service request may indicate a particular type of vehicle that is desired for the taxi service. For example, the taxi service request may include a request for a 7-passenger van, a convertible, a sport utility vehicle, a fuel-efficient vehicle, etc. The taxi service request may include a preference for autonomous vehicles 330 with certain features, such as heated and cooled seats, massage seats, music systems, etc.

The server 310 may receive the taxi service request from the mobile device 320, wherein the taxi service request includes the selected pickup time, the pickup location, the drop-off location, and the additional information or customer requests. The server 310 may select an autonomous vehicle 330 that is currently available to perform the taxi service in accordance with the taxi service request. The server 310 may select the autonomous vehicle 330 from the fleet of autonomous vehicles 330.

In one example, the server 310 may select the autonomous vehicle 330 using a vehicle registry 312 that is maintained at the server 310. The vehicle registry 312 may include a taxi service schedule for each autonomous vehicle 330 in the fleet of autonomous vehicles 330. The taxi service schedule may indicate whether the autonomous vehicle 330 is currently performing a taxi service or is available to perform a taxi service. In other words, the taxi service schedule may indicate a current availability of the autonomous vehicle 330. In addition, the vehicle registry 312 may include a current location for each autonomous vehicle 330 in the fleet of autonomous vehicles 330. The current location may indicate that the autonomous vehicle 330 is currently parked (i.e., stationary) on a particular street, parking garage, etc. Alternatively, the current location may indicate that the autonomous vehicle 330 is currently moving (i.e., performing a taxi service for a different customer).

The server 310 may access the vehicle registry 312 when selecting a particular autonomous vehicle 330 from the fleet of autonomous vehicles 330 to perform the taxi service for a customer. In one example, using the vehicle registry 312, the server 310 may identify an autonomous vehicle 330 from the fleet that is currently a shortest distance to the pickup location as compared to the other autonomous vehicles 330 in the fleet. In addition, the server 310 may calculate an estimated amount of time for the autonomous vehicle 330 to perform the taxi service and verify that the autonomous vehicle 330 is currently available for the estimated amount of time in order to perform the taxi service. In other words, even if a particular autonomous vehicle 330 is currently available, if the estimated amount of time to perform the taxi service indicates that the taxi service may conflict with an upcoming taxi service for the autonomous vehicle 330, then this particular autonomous vehicle 330 may not be selected to perform the taxi service for the customer. Since the server 310 may maintain the vehicle registry 312, which includes the taxi service schedules for each autonomous vehicle 330 in the fleet of autonomous vehicles 330, the server 310 may determine in real-time which autonomous vehicles 330 in the fleet are currently available to perform the taxi service, and then select one of the autonomous vehicles 330 to perform the taxi service accordingly. The server 310 may select the autonomous vehicle 330 based on a combination of a distance between the autonomous vehicle's current location and the pickup location (e.g., the mobile device's current location) and vehicle availability. In addition, the server 310 may select the autonomous vehicle 330 in accordance to the taxi service request received from the mobile device 320 with respect to vehicle features, vehicle type or model, vehicle seating capacity, etc.

As a non-limiting example, the server 310 may determine that vehicle A and vehicle B are both currently available to perform the taxi service. Vehicle A may be one mile from the pickup location and vehicle B may be three miles from the pickup location, and based on the distance between the vehicles and the pickup location, the server 310 may select vehicle A for performing the taxi service. However, if vehicle A does not have the seating capacity requested by the customer, but vehicle B does have the seating capacity, then the server 310 may select vehicle B, even though vehicle B is further away from the pickup location as vehicle A (which may result in a delayed pickup time). Therefore, the server 310 may weigh numerous factors (e.g., vehicle distance, vehicle availability, vehicle features) when selecting the autonomous vehicle 330 to perform the taxi service.

In one configuration, the server 310 may provide to the mobile device 320 a list of available autonomous vehicles 330 that are located in proximity to the pickup location. Each of the autonomous vehicles 330 on the list may be available to perform the taxi service for the customer. The list may include the features and capabilities of each available autonomous vehicle 330, and the customer may select which autonomous vehicle 330 is to perform the taxi service. Therefore, the customer may weigh factors such as the autonomous vehicle's capacity and capability, an amount of time to be picked up, a cost associated with each vehicle type, etc. when determining which autonomous vehicle 330 is to perform the taxi service.

The server 310 may instruct the autonomous vehicle 330 that is selected to perform the taxi service for the customer. The server 310 may send information on the selected pickup time, pickup location and drop-off location to the autonomous vehicle 330. In one configuration, the server 310 may provide the autonomous vehicle 330 with a route for traveling from the autonomous vehicle's current location to the pickup location, or alternatively, the autonomous vehicle 330 may generate the route based on the autonomous vehicle's current location and the pickup location. The autonomous vehicle 330 may send a message acknowledging that the autonomous vehicle 330 will perform the taxi service for the customer.

In one example, the server 310 may update or modify the vehicle registry 312 to indicate that the selected autonomous vehicle 330 is currently performing the taxi service. In particular, the server 310 may update the taxi service schedule associated with the autonomous vehicle 330 to reflect the new taxi service being performed by the autonomous vehicle 330. The server 310 may update the taxi service schedule in order to maintain up-to-date information on the taxi services to be performed by the autonomous vehicle 330.

After selecting the autonomous vehicle 330 to perform the taxi service, the server 310 may calculate an estimated arrival time for the autonomous vehicle 330 to arrive at the pickup location. In other words, the server 310 may estimate an amount of time for the selected autonomous vehicle 330 to travel from the autonomous vehicle's current location (e.g., a parking garage) to the pickup location. The server 310 may calculate the estimated arrival time based on a distance between the autonomous vehicle's current location and the pickup location, traffic information, etc.

In one example, the server 310 may send a confirmation message to the mobile device 320 after scheduling the autonomous vehicle 330 to perform the taxi service. The confirmation message may confirm that the taxi service is to be performed. The confirmation message may include the estimated arrival time for the autonomous vehicle 330. In addition, the confirmation message may confirm details of the taxi service to be performed, such as the pickup location, drop-off location, vehicle type, estimated cost, etc.

After receiving instructions from the server 310 to perform the taxi service, the autonomous vehicle 330 may drive from the autonomous vehicle's current location to the pickup location. The autonomous vehicle 330 may have been stationed at a base location, such as a parking lot or parking garage. After receiving instructions from the server 310, the autonomous vehicle 330 may exit its current location and start driving to the pickup location. In one example, one or more processors of the autonomous vehicle 330 may provide commands to drive the autonomous vehicle 330 from the autonomous vehicle's current location to the pickup location. The one or more processors may provide commands to the autonomous vehicle's actuators, thereby controlling steering, acceleration, braking and throttle of the autonomous vehicle 330.

In one example, based on the pickup location received from the server 310, the autonomous vehicle 330 may determine a route for traveling from the autonomous vehicle's current location to the pickup location. The autonomous vehicle 330 may use real-time traffic information when determining the route for traveling from the autonomous vehicle's current location to the pickup location. The pickup location may be a current location associated with the mobile device 320, or a location that is specified in the taxi service request communicated from the mobile device 320 to the server 310. In an alternative configuration, the server 310 may provide the route to the autonomous vehicle 330, and the autonomous vehicle 330 may follow the route when driving to the pickup location.

In one example, the autonomous vehicle 330 may send a notification to the mobile device 320 when the autonomous vehicle 330 is approaching the pickup location (e.g., when the autonomous vehicle 330 is five minutes away from the pickup location), as well as an additional notification when the autonomous vehicle 330 has arrived at the pickup location. In one example, the autonomous vehicle 330 may determine that the pickup time may be delayed, for example, due to traffic. The autonomous vehicle 330 may calculate an adjusted pickup time based on traffic information for the route being used by the autonomous vehicle 330 to perform the taxi service. The autonomous vehicle 330 may notify the mobile device 320 of the adjusted pickup time. In an alternative configuration, the server 310 may track the location of the autonomous vehicle 330 when the autonomous vehicle 330 is driving to the pickup location, and notify the mobile device 320 when the autonomous vehicle 330 is in proximity to and/or has arrived at the pickup location.

In one configuration, the autonomous vehicle 330 may adjust one or more settings and/or features of the autonomous vehicle 330 before arriving at the pickup location. The autonomous vehicle 330 may adjust the settings and/or features based on a user profile associated with the mobile device 320. For example, the user profile may indicate that the individual likes a certain type of music, a certain temperature setting, a certain seat position, a certain type of lighting, etc. Therefore, the autonomous vehicle 330 may adjust a music system, a heating and cooling system, a lighting system, etc. of the autonomous vehicle 330 to correspond with the user profile before arriving at the pickup location.

When the autonomous vehicle 330 arrives at the pickup location, the customer may be granted access to the autonomous vehicle 330 upon providing a form of authentication. For example, the server 310 may previously send the customer a security code, and the customer may provide the security code to the autonomous vehicle 330 (e.g., via a keypad on the autonomous vehicle's door) in order to gain access to the autonomous vehicle 330. In another example, the autonomous vehicle 330 may detect that the customer's mobile device 320 is in proximity to the autonomous vehicle 330, which may infer that the customer is carrying the mobile device 320 that requested the taxi service. Therefore, the autonomous vehicle 330 may permit the customer to enter into the autonomous vehicle 330.

In one example, the autonomous vehicle 330 may drive from the pickup location to the drop-off location. The autonomous vehicle 330 may select a route for traveling from the pickup location to the drop-off location. For example, the autonomous vehicle 330 may select an optimal route based on real-time traffic information. The autonomous vehicle 330 may drive from the pickup location to the drop-off location in accordance with the route information. Alternatively, the server 310 may determine the route for traveling to the drop-off location. The autonomous vehicle 330 may receive route information from the server 310, and drive from the pickup location to the drop-off location in accordance with the route information.

In one example, the autonomous vehicle 330 may arrive at the drop-off location and the customer may exit the autonomous vehicle 330. The customer may be charged for the taxi service based on a distance between the pickup location and the drop-off location and/or an amount of time taken to travel from the pickup location to the drop-off location. The customer may be charged for the taxi service using bank information or credit card information that is maintained at the server 310. In one example, the server 310 may have received the bank information or credit card information from the customer in the taxi service request.

In one example, the autonomous vehicle 330 may send a notification to the server 310 when the taxi service is completed. The server 310 may update the vehicle registry 312 to indicate that the autonomous vehicle 330 has completed the taxi service. In one example, the server 310 may send the autonomous vehicle 330 instructions to perform another taxi service upon the server 310 receiving the notification from the autonomous vehicle 330. In another example, the autonomous vehicle 330 may currently have no more taxi services to perform. In this case, the autonomous vehicle 330 may drive to a base location (e.g., a parking lot associated with the taxi service provider), and wait to receive further instructions from the server 310. The vehicle registry 312 may indicate that the autonomous vehicle 330 is available to perform taxi services when the autonomous vehicle 330 is parked at the base location. Therefore, the server 310 may schedule the autonomous vehicle 330 to perform additional taxi services when the autonomous vehicle 330 is available and parked at the base location.

As a non-limiting example, a customer currently at a bookstore may wish to be dropped off at a sports arena. The customer may access a mobile device 320, and via an application 322 executing on the mobile device 320, the customer may request a taxi service from a server 310 that is associated with a taxi service provider. The taxi service request may indicate the pickup location as the bookstore and the drop-off location as the sports arena. In addition, the customer may request that the taxi service be performed as soon as possible. The server 310 may select an autonomous vehicle 330 that is currently available and located relatively close to the pickup location (i.e., the bookstore). The server 310 may send instructions to the autonomous vehicle 330 for performing the taxi service. The instructions may include the selected pickup time, the pickup location, the drop-off location, customer identity information, etc. In addition, the server 310 may send a confirmation message to the mobile device 320 to confirm that the customer will be picked up at the bookstore and transported to the sports arena. The confirmation message may include an estimated amount of time for the autonomous vehicle 330 to arrive at the bookstore (e.g., ten minutes). The selected autonomous vehicle 330 may receive the instructions from the server 310, and based on the instructions, the autonomous vehicle 330 may start driving to the pickup location (i.e., the bookstore). The mobile device 320 may receive a notification when the autonomous vehicle 330 has arrived at the bookstore. The customer may provide a form of authentication (e.g., a security code) to enter into the autonomous vehicle 330. The autonomous vehicle 330 may drive to the sports arena and drop off the customer. Afterwards, the autonomous vehicle 330 may notify the server 310 that the taxi service is completed and the autonomous vehicle 330 is available to perform additional taxi services. The autonomous vehicle 330 may drive to a selected location (e.g., a parking lot) and wait to receive additional instructions from the server 310 for additional taxi services.

Figure 4:
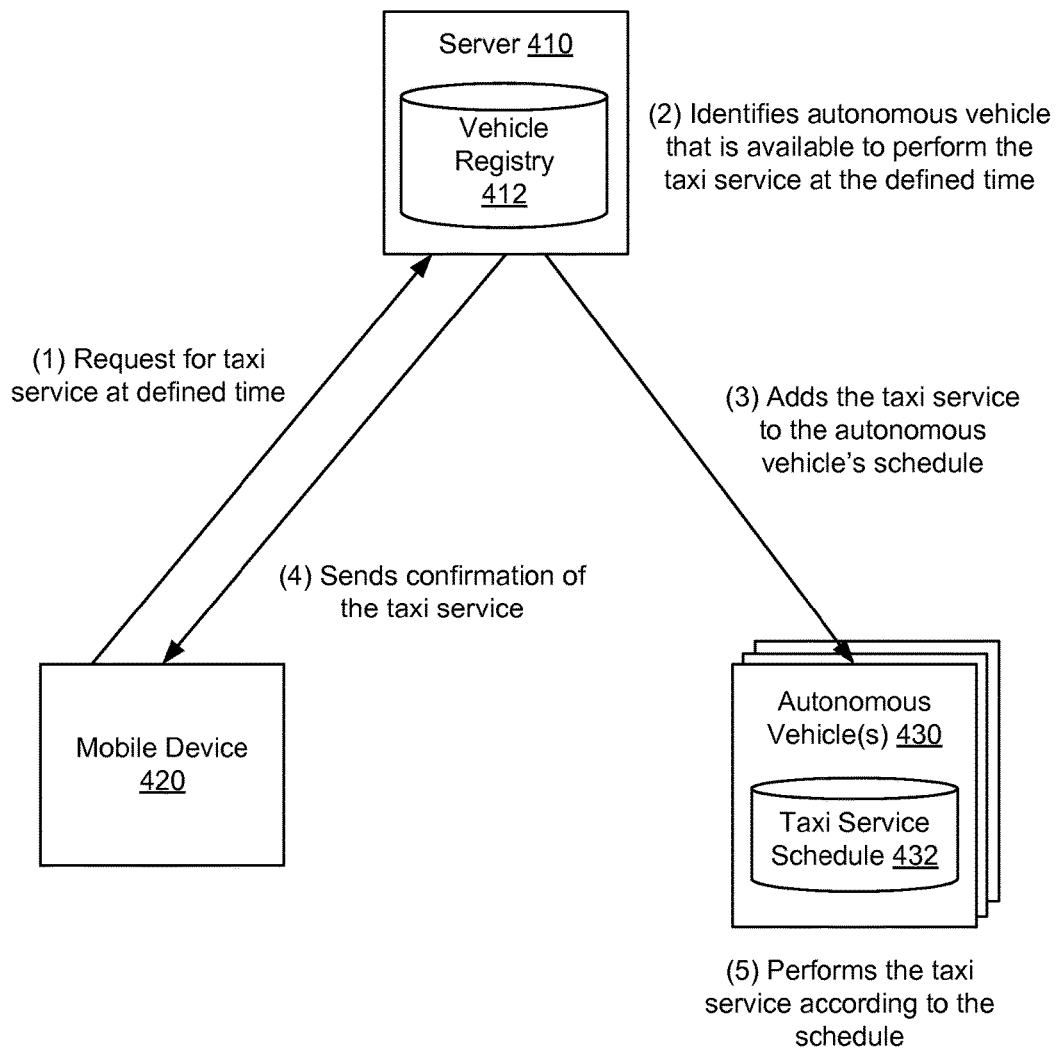
FIG. 4 illustrates another system and related operations for dispatching an autonomous vehicle to perform a taxi service according to an example of the present technology.

FIG. 4 illustrates an exemplary system and related operations for dispatching an autonomous vehicle 430 to perform a taxi service. The autonomous vehicle 430 may be included in a fleet of autonomous vehicles 430 that provide taxi services to a plurality of customers. The fleet of autonomous vehicles 430 may be controlled by a taxi service provider via a server 410. In other words, the server 410 may receive taxi service requests from customers, and select autonomous vehicles 430 to perform the taxi services. The taxi service may involve the autonomous vehicle 430 driving to a pickup location to pick up a customer at a selected pickup time, and then driving to a drop-off location to drop off the customer.

In one example, a customer may send a taxi service request to the server 410 via a mobile device 420. The taxi service request may indicate that the customer is requesting a taxi service from the taxi service provider. The taxi service request may include various details about the taxi service, such as a pickup location, a pickup time, a drop-off location and/or drop-off time. In one example, the pickup time may be later in the day, the following day, etc. In other words, the customer may request for the taxi service to be performed at a subsequent time. In one example, the taxi service request communicated from the mobile device 320 to the server 310 may include a drop-off time, but not the pickup time. Based on the drop-off time, the pickup location, and the drop-off location, the server 310 may calculate the pickup time based on a distance between the pickup location and the drop-off location, as well as estimated traffic conditions while the taxi service is being performed.

The server 410 may access a vehicle registry 412 that maintains a schedule for each autonomous vehicle 430 in the fleet of autonomous vehicles 430. Based on the vehicle registry 412, the server 410 may identify the autonomous vehicles 430 that are available to pick up the customer at the requested pickup time. In addition, the server 410 may identify the autonomous vehicles 430 that are expected to be located in proximity to the pickup location at the requested pickup time. The server 410 may select the autonomous vehicle 430 to perform the taxi service based on the autonomous vehicle's availability at the requested pickup time, an estimated proximity to the pickup location at the requested pickup time, vehicle features, vehicle seating capacity, etc. In addition, the server 410 may calculate an estimated amount of time for the autonomous vehicle 430 to perform the taxi service and verify, based on the autonomous vehicle's schedule included in the vehicle registry 412, that the autonomous vehicle 430 is available for the estimated amount of time in order to perform the taxi service.

The server 410 may instruct the autonomous vehicle 430 that is selected to perform the taxi service for the customer. The server 410 may send information on the selected pickup time, pickup location and drop-off location to the autonomous vehicle 430. The autonomous vehicle 430 may perform the taxi service after receiving the instructions from the server 410. In addition, the server 410 may send a confirmation message to the mobile device 420 confirming that the autonomous vehicle 130 will pick up the customer at the pickup location and at the requested pickup time.

In one example, the server 410 may update or modify the vehicle registry 412 to indicate that the autonomous vehicle 430 is scheduled to perform the taxi service at the selected pickup time. After the taxi service is scheduled, the server 410 may not schedule other taxi services for the autonomous vehicle 430 that conflict with the taxi service.

In one example, a taxi service schedule 432 may be locally maintained at the autonomous vehicle 430. The server 410 may update or modify the taxi service schedule 432 to indicate that the autonomous vehicle 430 is scheduled to perform the taxi service at the selected pickup time. The autonomous vehicle 430 may be configured to perform taxi services in accordance with the taxi service schedule 432. For example, if the taxi service schedule 432 indicates that the autonomous vehicle 430 is scheduled to perform three taxi services on a given day, the autonomous vehicle 430 may automatically perform the three taxi services unless contradictory instructions are received from the server 410.

In one example, the autonomous vehicle 430 may be parked at a base location prior to performance of the taxi service for the customer. For example, before the taxi service is to be performed, the autonomous vehicle 430 may be parked in a parking area associated with the taxi service provider. The autonomous vehicle 430 may detect the taxi service to be performed based on the taxi service schedule 432 maintained at the autonomous vehicle 430. The autonomous vehicle 430 may determine when to start driving from the base station in order to arrive at the pickup location at the requested pickup time. In one example, the autonomous vehicle 430 may use real-time traffic information to determine when to exit the base station in order to arrive at the pickup location at the requested pickup time.

In one example, the autonomous vehicle 430 may drive to the pickup location and then drop off the customer at the drop-off location. The autonomous vehicle 430 may notify the server 410 that the taxi service has been completed. In addition, the autonomous vehicle 430 may indicate an availability to perform other taxi services to the server 410. The autonomous vehicle 430 may drive back to the base location and wait to receive further taxi service instructions from the server 410. In one example, the autonomous vehicle 430 may immediately perform another taxi service in accordance with the taxi service schedule 432. In another example, the autonomous vehicle 430 may be scheduled to perform another taxi service in two hours, so the autonomous vehicle 430 may drive back to the base location and wait until the next taxi service is ready to be performed.

As a non-limiting example, a customer may request a taxi service to the airport for the following day. The customer may send via a mobile phone 420, the request to a server 410 associated with a taxi service provider. The customer may specify a pickup time (e.g., Saturday at 6 AM), a pickup location (e.g., the customer's house), and the drop-off location (e.g., the airport). In addition, the customer may request a van with a seating capacity for seven passengers. Based on the vehicle registry 412, the server 410 may select an autonomous vehicle 430 that is available to perform the taxi service at the selected pickup time. The server 410 may verify that the autonomous vehicle 430 satisfies the customer's request with respect to seating capacity. The server 410 may send instructions to the autonomous vehicle 430 for performing the taxi service at the selected pickup time. The server 410 may update the vehicle registry 412 to reflect the newly scheduled taxi service. In addition, the server 410 may update the taxi service schedule 432 that is locally maintained at the autonomous vehicle 430. The server 410 may send a confirmation message to the mobile device 420 to confirm that the customer will be picked up at the customer's home at the selected pickup time and driven to the airport. The autonomous vehicle 430 may drive to the customer's home at the selected pickup time in accordance with the taxi service schedule 432, and then drive to the airport in order to drop off the customer.

Figure 5:
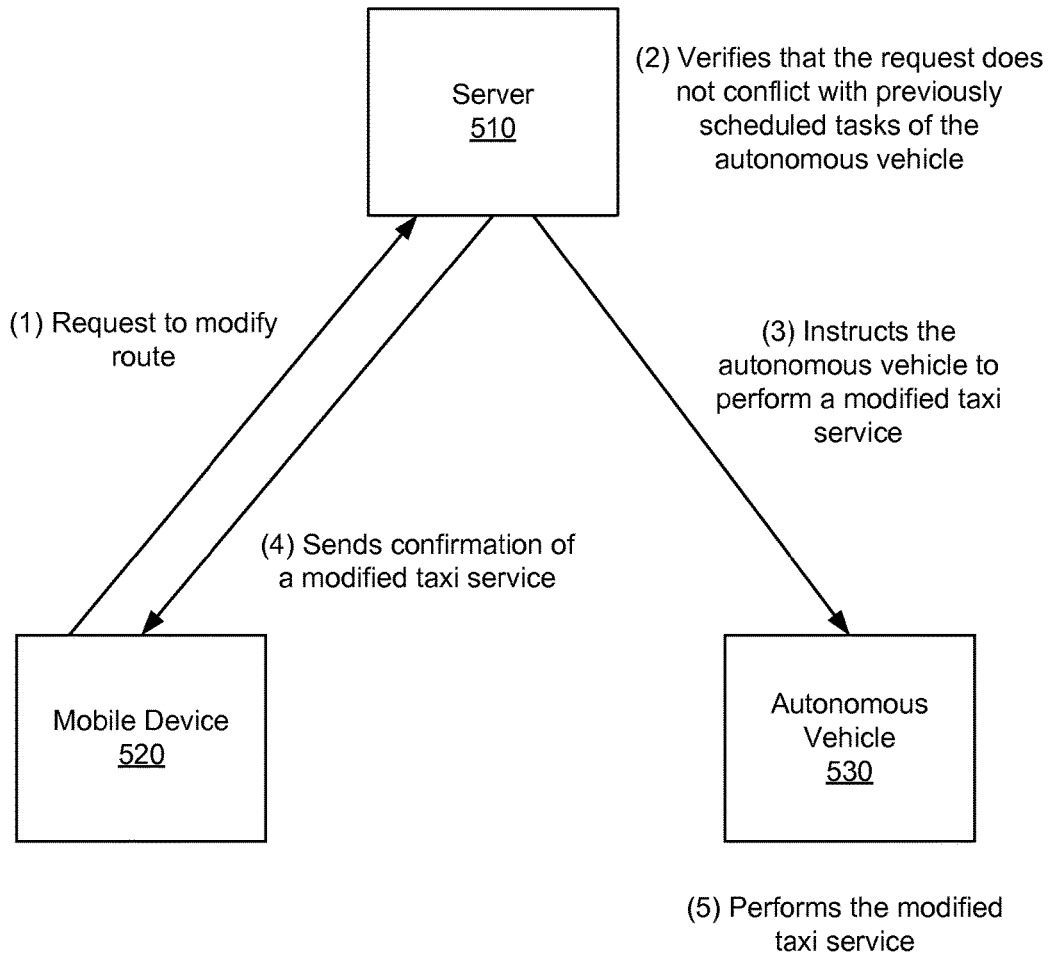
FIG. 5 illustrates a system and related operations for modifying a route when an autonomous vehicle is performing a taxi service according to an example of the present technology.

FIG. 5 illustrates an exemplary system and related operations for modifying a route when an autonomous vehicle 530 is performing a taxi service. The autonomous vehicle 530 may be performing the taxi service for a customer. The customer may have sent a taxi service request, via a mobile device 520, to a server 510 associated with a taxi service provider. Based on the taxi service request, the autonomous vehicle 530 may perform the taxi service.

In one example, when the autonomous vehicle 530 is driving from a pickup location to a drop-off location in accordance with the taxi service, the mobile device 520 may send an additional request to the server 510 for modifying a route associated with the taxi service. In other words, the mobile device 520 may send the additional request enroute to the drop-off location. In one example, the customer may request to modify the route, such that the autonomous vehicle 530 drives to an alternative drop-off location. In another example, the customer may request to modify the route, such that the autonomous vehicle 530 stops at a designated location (e.g., an ice cream parlor), and then continues driving to the drop-off location.

The server 510 may receive the additional request to modify the taxi service from the mobile device 520. The server 510 may verify that the additional time needed to perform the modified taxi service does not conflict with previously scheduled taxi services for the autonomous vehicle 530. If there is no conflict, the server 510 may instruct the autonomous vehicle 530 to perform the modified taxi service in accordance with the additional request received from the mobile device 520. If there is a conflict with a previously scheduled task, then the server 510 may notify the mobile device 520 that the existing route is unable to be modified. Alternatively, if there is a conflict between the modified taxi service and a previously scheduled task, the server 510 may select another autonomous vehicle to perform the previously scheduled task and the autonomous vehicle 530 may perform the modified taxi service.

As a non-limiting example, the autonomous vehicle 530 may be driving a customer to a birthday party. While enroute to the birthday party, the customer may realize they have forgotten to buy a birthday gift. The customer may send, via the mobile device 520, an additional request to modify an existing taxi service to the server 510. In particular, the customer may request to stop at a department store, and then go to the birthday party. The server 510 may determine to modify the route based on the customer's request. The server 510 may send instructions to the autonomous vehicle 530 for modifying the route. Therefore, the autonomous vehicle 530 may stop at the department store, and then continue driving to the birthday party.

Figure 6:
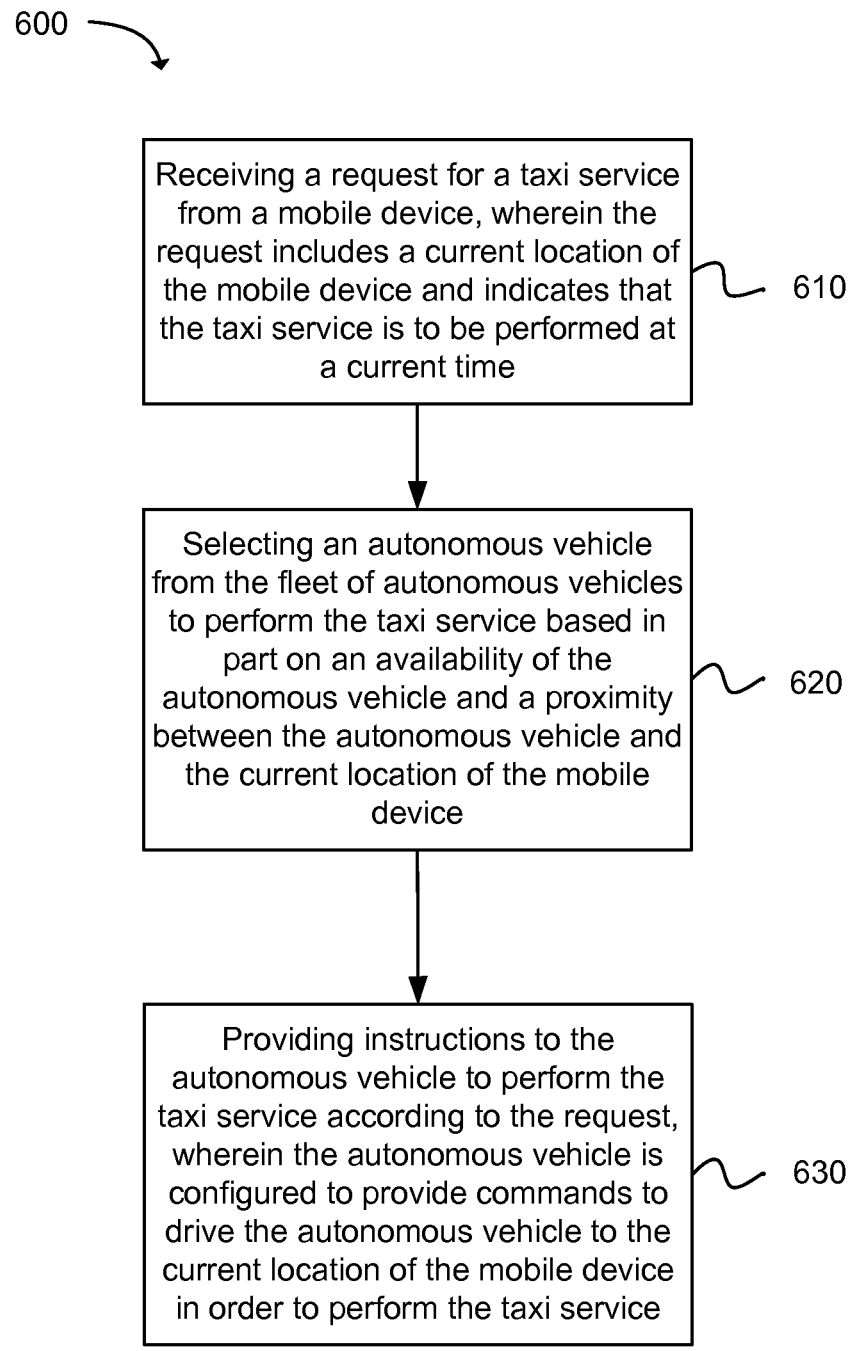
FIG. 6 is a flowchart of a method for controlling an autonomous vehicle according to an example of the present technology.

FIG. 6 illustrates an example of a method 600 for operating a fleet of autonomous vehicles. The method may be executed as instructions on a machine, where the instructions are included on at least one computer readable medium or one non-transitory machine readable storage medium. The method may be executed by one or more processors on the machine. The method may include the operation of receiving a request for a taxi service from a mobile device, wherein the request includes a current location of the mobile device and indicates that the taxi service is to be performed at a current time, as in block 610. The method may include the operation of selecting an autonomous vehicle from the fleet of autonomous vehicles to perform the taxi service based in part on an availability of the autonomous vehicle and a proximity between the autonomous vehicle and the current location of the mobile device, as in block 620. The method may include the operation of providing instructions to the autonomous vehicle to perform the taxi service according to the request, wherein the autonomous vehicle is configured to provide commands to drive the autonomous vehicle to the current location of the mobile device in order to perform the taxi service, as in block 630.

In one example, the request for the taxi service includes at least one of: a pickup location, a drop-off location, a number of passengers, or a selected vehicle type. In one example, the method may include the operations of: estimating an amount of time to perform the taxi service based, in part, on the current location of the mobile device and a drop-off location indicated in the request; and selecting the autonomous vehicle when the amount of time to perform the taxi service does not conflict with a previously scheduled taxi service for the autonomous vehicle.

In one example, the method may include the operations of: determining an estimated arrival time for the autonomous vehicle to arrive at the current location of the mobile device; and sending a confirmation to the mobile device that the autonomous vehicle is to arrive at the current location of the mobile device in order to perform the taxi service and the estimated arrival time. In one example, the method may include the operation of sending an additional notification with an updated estimated arrival time when the autonomous vehicle is delayed due to road traffic. In one example, the method may include the operations of: tracking a location of the autonomous vehicle when the autonomous vehicle is driving to the current location of the mobile device; and sending a notification to the mobile device after the autonomous vehicle has arrived at the current location of the mobile device.

In one example, the method may include the operations of: determining that the autonomous vehicle has completed the taxi service; and marking the autonomous vehicle as being available to perform additional taxi services. In one example, the method may include the operation of instructing the autonomous vehicle to drive to a default parking space after completing the taxi service and wait for instructions to perform an additional taxi service.

Figure 7:
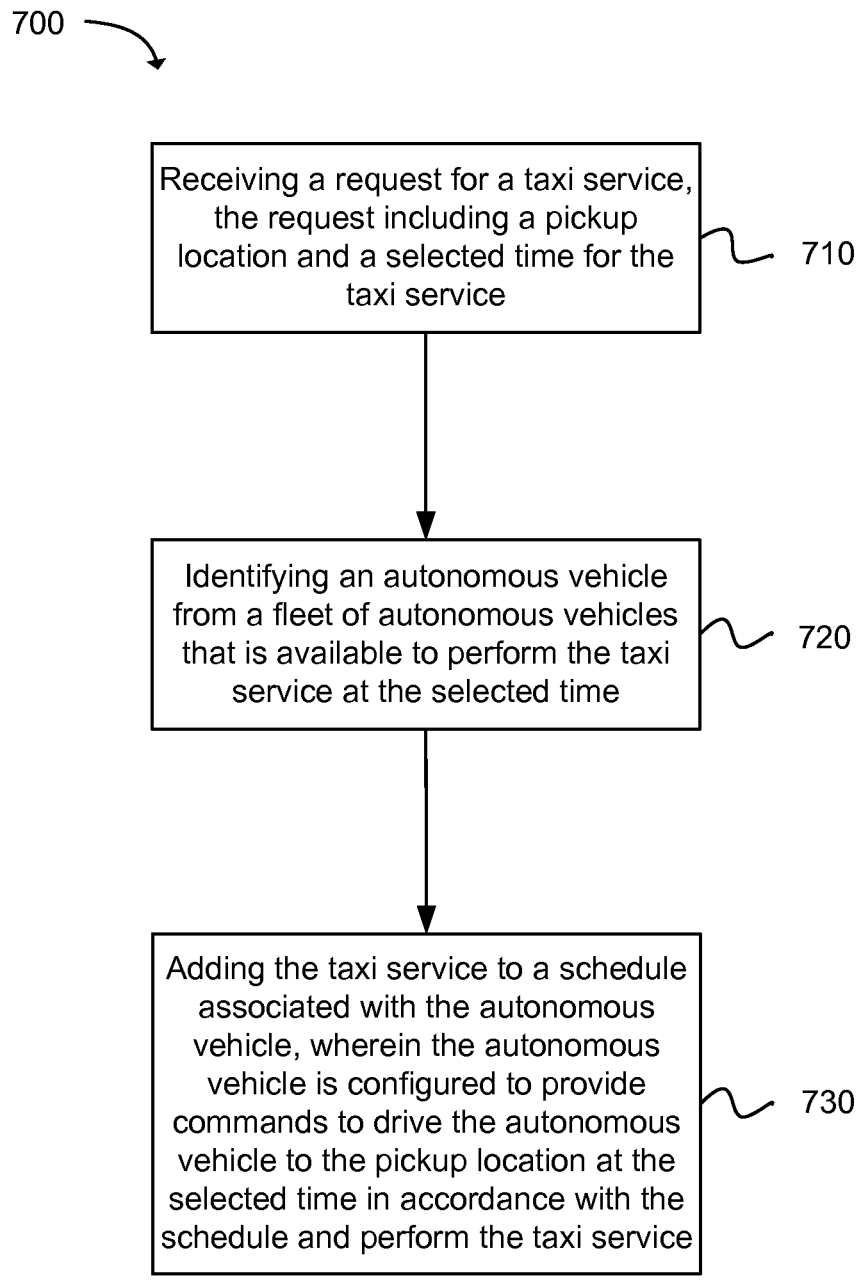
FIG. 7 is a flowchart of a method for controlling an autonomous vehicle according to an example of the present technology.

In one example, the method may include the operations of: adding additional taxi services to a schedule associated with the autonomous vehicle; and sending the schedule to the autonomous vehicle, wherein the autonomous vehicle is configured to perform the additional taxi services in accordance with the schedule. In one example, the method may include the operation of maintaining a list of autonomous vehicles that includes, for each autonomous vehicle on the list, a current location of the autonomous vehicle and a taxi schedule associated with the autonomous vehicle. In one example, the method may include the operations of: receiving an additional request, from the mobile device, to modify a route associated with the taxi service in route to a drop-off location; verifying that the additional request to modify the route does not conflict with a previously scheduled taxi service for the autonomous vehicle; and instructing the autonomous vehicle to perform a modified taxi service in accordance with the additional request from the mobile device FIG. 7 illustrates an example of a method 700 for operating a fleet of autonomous vehicles. The method may be executed as instructions on a machine, where the instructions are included on at least one computer readable medium or one non-transitory machine readable storage medium. The method may be executed by one or more processors on the machine. The method may include the operation of receiving a request for a taxi service, the request including a pickup location and a selected time for the taxi service, as in block 710. The method may include the operation of identifying an autonomous vehicle from a fleet of autonomous vehicles that is available to perform the taxi service at the selected time, as in block 720. The method may include the operation of adding the taxi service to a schedule associated with the autonomous vehicle, wherein the autonomous vehicle is configured to provide commands to drive the autonomous vehicle to the pickup location at the selected time in accordance with the schedule and perform the taxi service, as in block 730.

In one example, the autonomous vehicle is identified based, in part, on an estimated distance between the autonomous vehicle and the pickup location at the selected time. In one example, the method may include the operation of sending a confirmation to a user indicating that the autonomous vehicle is scheduled to arrive at the pickup location at substantially the selected time. In one example, the method may include the operations of: tracking a location of the autonomous vehicle when the autonomous vehicle is driving to the pickup location, wherein the autonomous vehicle is configured to use traffic information to determine a starting time for driving to the pickup location in order to arrive at the pickup location at substantially the selected time; and sending a notification to a user after the autonomous vehicle has arrived at the pickup location.

Figure 8:
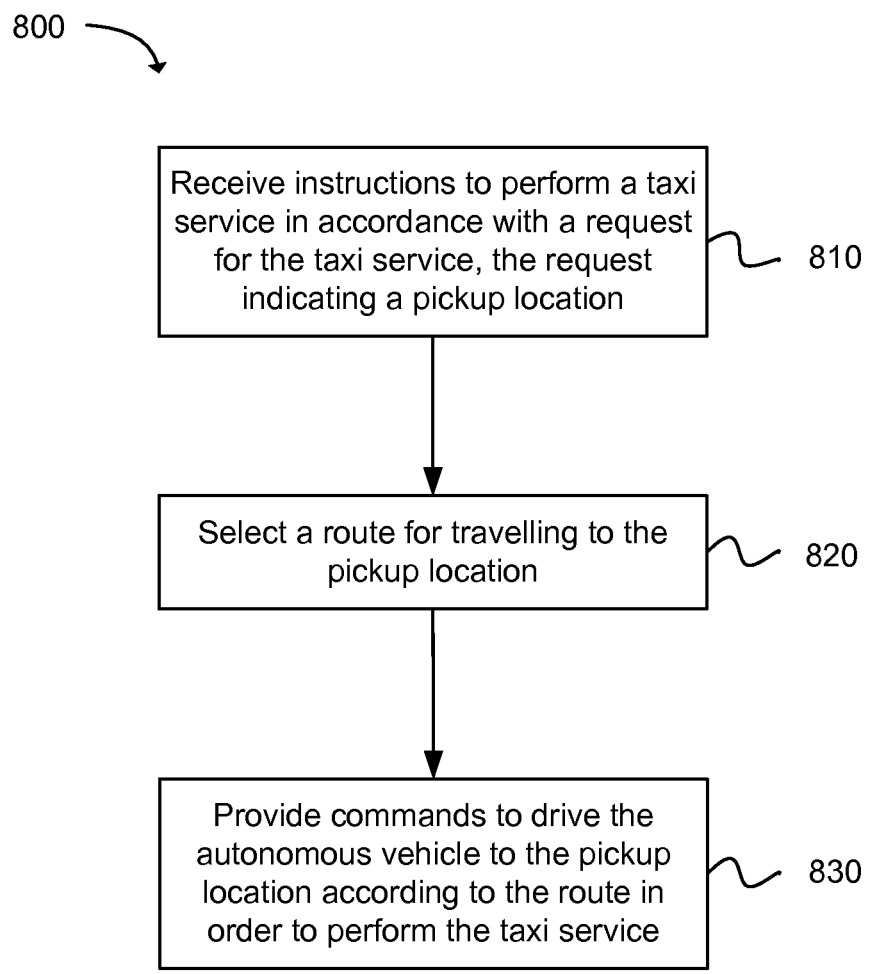
FIG. 8 depicts functionality of an autonomous vehicle according to an example of the present technology.

Another example provides functionality 800 of an autonomous vehicle, as shown in the flow chart in FIG. 8. The functionality can be implemented as a method or the functionality can be executed as instructions on a machine, where the instructions are included on at least one computer readable medium or one non-transitory machine readable storage medium. The method may be executed by one or more processors on the machine. The autonomous vehicle may be configured to receive instructions to perform a taxi service in accordance with a request for the taxi service, the request indicating a pickup location, as in block 810. The autonomous vehicle may be configured to select a route for travelling to the pickup location, as in block 820. The autonomous vehicle may be configured to provide commands to drive the autonomous vehicle to the pickup location according to the route in order to perform the taxi service, as in block 830.

In one example, the autonomous vehicle may verify that a user at the pickup location submitted the request for the taxi service before permitting the user to enter into the autonomous vehicle. In one example, the autonomous vehicle may select the route for traveling to the pickup location based on traffic information. In one example, the instructions indicate that the taxi service is to be performed at a current time or an upcoming time. In one example, the autonomous vehicle may notify a taxi service system after the taxi service has been completed and the autonomous vehicle is available to perform additional taxi services.

Figure 9:
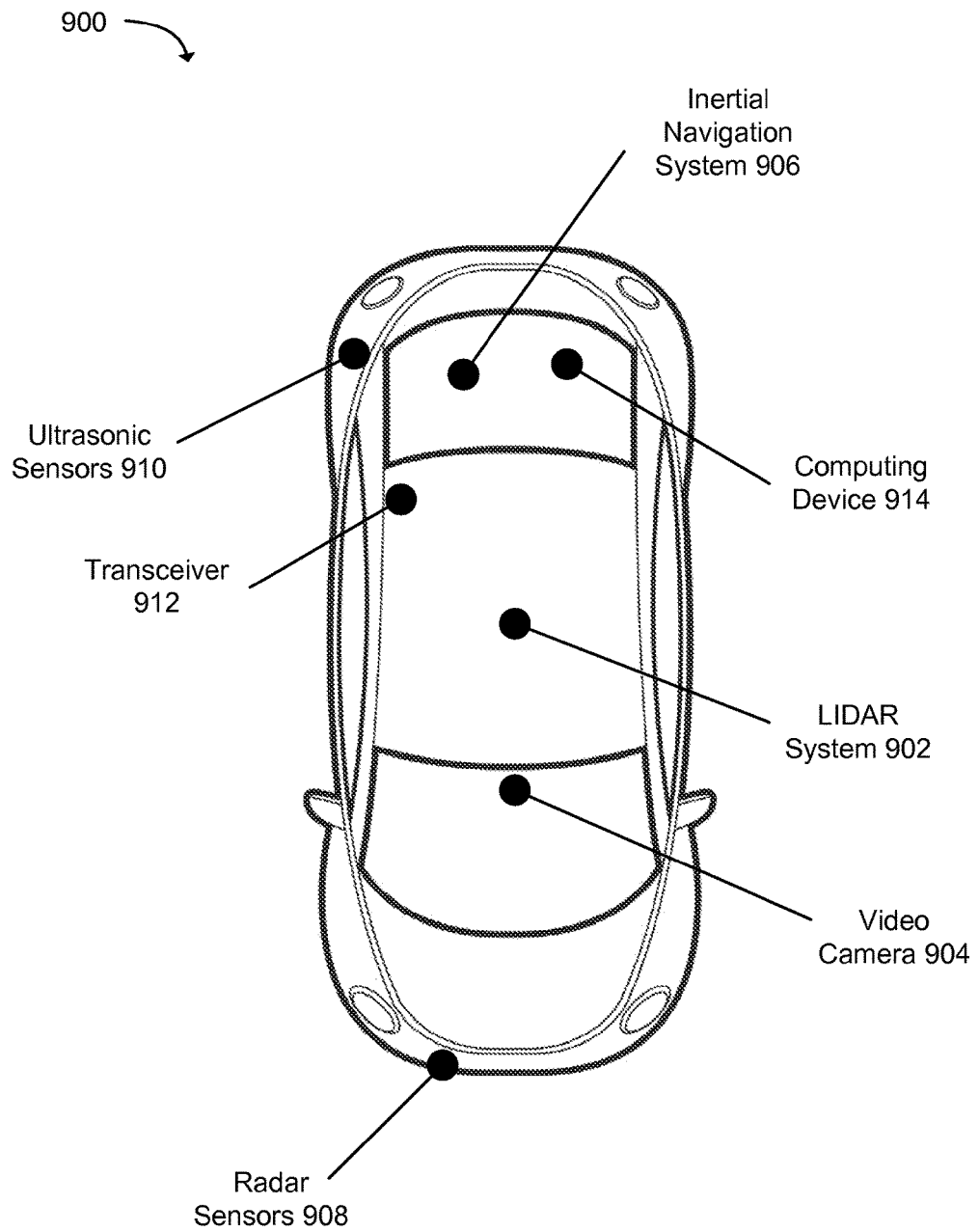
FIG. 9 illustrates an autonomous vehicle according to an example of the present technology.

FIG. 9 illustrates an example of an autonomous vehicle 900 that is capable of sensing a surrounding environment and navigating itself to a destination. The autonomous vehicle 900 may be classified as a "Level 0" autonomous vehicle, a "Level 1" autonomous vehicle, a "Level 2" autonomous vehicle, a "Level 3" autonomous vehicle, or a "Level 4" autonomous vehicle. In Level 0, a driver may control the autonomous vehicle 900 at substantially all times. The driver may be in complete and sole control of primary vehicle controls, such as brake, steering, throttle and motive power. In Level 1, one or more individual controls may be automated in the autonomous vehicle 900, such as electronic stability control or automatic braking, in which the vehicle may automatically assist with braking to enable the driver to regain control of the vehicle or stop faster than possible by acting alone. In Level 2, at least two controls may be automated in unison in the autonomous vehicle 900, such as adaptive cruise control in combination with lane keeping. In Level 3, the driver may cede full control of substantially all safety-critical functions to the autonomous vehicle 900 under certain traffic or environmental conditions. The autonomous vehicle 900 may sense when certain conditions necessitate the driver to retake control of the autonomous vehicle 900 and a sufficiently comfortable transition time may be provided for the driver to retake control of the autonomous vehicle 900. In Level 4, the autonomous vehicle 900 may perform substantially all safety-critical driving functions and monitor roadway conditions for an entire trip. The driver may provide destination or navigation input, but the driver may not be expected to control the autonomous vehicle 900 at any time during the trip. As the autonomous vehicle 900 may control all functions from start to stop, including parking functions, in level 4, the autonomous vehicle 900 may include both occupied and unoccupied vehicles. In one example, the autonomous vehicle 900 may be restricted to operating in certain environments or under certain conditions based on government regulations.

The autonomous vehicle 900 may include, but is not limited to, cars, trucks, motorcycles, buses, recreational vehicles, golf carts, trains, and trolleys. The autonomous vehicle 900 may include an internal combustion engine that operates using liquid fuels (e.g., diesel, gasoline). Alternatively, the autonomous vehicle 900 may include one or more electric motors that operate using electrical energy stored in batteries. The autonomous vehicle 900 may include, but is not limited to, a light detection and ranging (LIDAR) system 902, a video camera 904, an inertial navigation system 906, radar sensors 908, ultrasonic sensors 910, a transceiver 912, and a computing device 914 that, while working together in combination, enable the autonomous vehicle 900 to sense the environment and navigate to the destination with reduced user input. The autonomous vehicle 900 may use information captured by the various sensors, cameras, etc. to safely drive the autonomous vehicle 900 along a route to a destination, while avoiding obstacles and obeying traffic laws. The autonomous vehicle 900 may perform a series of steps when following the route to the destination. For example, the autonomous vehicle 900 may drive 500 meters, turn right, drive 1000 meters, turn left, etc. in order to reach the destination.

The LIDAR system 902 (also known as a laser range finder) may be mounted onto a surface (e.g., a top surface) of the autonomous vehicle 900. The LIDAR system 902 may emit a plurality of light pulses and measure an amount of time for the light pulses to return to the autonomous vehicle 900, thereby allowing the LIDAR system 902 to measure the distance of objects surrounding the autonomous vehicle 900.

As a non-limiting example, the LIDAR system 902 may measure the distance of objects within 200 meters from the autonomous vehicle 900.

One or more video cameras 904 may be mounted to a front, rear or side portion of the autonomous vehicle 900. The autonomous vehicle 900 may use the LIDAR system 902 and the video camera 904 to build a three-dimensional (3D) map of the autonomous vehicle's surroundings. The 3D map may capture a 360-degree view around the autonomous vehicle 900. In one example, the 3D map may capture the autonomous vehicle's surroundings within 200 meters. The 3D map may include a variety of features, such as road edges, road signs, lane markings, guardrails, overpasses, etc. The 3D map may indicate stationary objects, such as buildings, telephone poles, mailboxes, etc. In addition, the 3D map may indicate moving objects, such as other vehicles, bicyclists, pedestrians, etc.

In one example, the 3D map generated using the LIDAR system 902 and the video camera 904 may be correlated with high-resolution maps of the world. The high-resolution maps may indicate lane markings, terrain, elevation, speed limits, and other features related to the route taken by the autonomous vehicle 900 when driving to the destination. In addition, the autonomous vehicle 900 may position or localize itself within the 3D map. In other words, the autonomous vehicle 900 may determine its position in relation to the objects included in the 3D map. The autonomous vehicle 900 may determine its position by using the inertial navigation system 906. The inertial navigation system 906 may calculate a position, orientation, and velocity (i.e., direction and speed of movement) of the autonomous vehicle 900.

The inertial navigation system 906 may include a combination of gyroscopes, altimeters, tachometers, gyroscopes and other motion-sensing devices in order to calculate the autonomous vehicle's position. The inertial navigation system 906 may determine an initial position and velocity, and thereafter compute the autonomous vehicle's updated position and velocity by integrating information received from the motion-sensing devices. In one example, a GPS receiver (not shown in FIG. 9) may provide the initial position of the autonomous vehicle 900 (e.g., latitude, longitude, altitude). Thereafter, the autonomous vehicle 900 may use the inertial navigation system 906 to determine its position in relation to the objects on the 3D map. As the autonomous vehicle 900 drives to the destination, updated positional information from the inertial navigation system 906 may continually update the 3D map of the autonomous vehicle's surroundings.

The radar sensors 908 may be mounted on front, rear and/or side sections of the autonomous vehicle 900. The radar sensors 908 may monitor a position of proximately-located vehicles on the road, such as vehicles immediately behind or in front of the autonomous vehicle 900. In addition, ultrasonic sensors 910 may be used to measure a distance to proximately-located objects, such as curbs or other vehicles when the autonomous vehicle 900 is parking. The radar sensors 908 and the ultrasonic sensors 910 may be used when generating and updating the 3D map of the autonomous vehicle's surroundings. For example, the radar sensors 908 and the ultrasonic sensors 910 may detect objects that are located in proximity to the autonomous vehicle 900 and those objects may be included in the 3D map of the autonomous vehicle's surroundings.

The transceiver 912 may allow the autonomous vehicle 900 to communicate with other devices or systems when driving to the destination. For example, the transceiver 912 may communicate with other vehicles on the road using vehicle-to-vehicle (V2V) communication. V2V communication may use dedicated short-range communications (DSRC) and operate in the 5.9 GHz frequency range. The range for V2V communication may be approximately 300 meters. In addition, the transceiver 912 may communicate with computing devices (e.g., mobile phones, tablet computers) that provide instructions to the autonomous vehicle 900 via wireless communication standards, such as Third Generation Partnership Project (3GPP) Long Term Evolution (LTE), Wi-Fi, WiMAX, Bluetooth, etc. The above list of wireless communication standards is non-limiting and is intended to include related wireless communication standards that are forthcoming. In one example, the transceiver 912 may enable the autonomous vehicle 900 to receive messages from the computing devices, such as messages requesting a pickup, messages instructing the autonomous vehicle 900 to perform a particular task, etc.

The computing device 914 may receive information collected and/or generated from the LIDAR system 902, the video cameras 904, the inertial navigation system 906, the radar sensors 908, the ultrasonic sensors 910, and the transceiver 912. The computing device 914 may process the information (e.g., the 3D map of the vehicle's surroundings) in real-time and determine whether to modify the autonomous vehicle's current velocity and orientation in response to the sensed environment. The computing device 914 may use the received information in order to provide commands to the autonomous vehicle's actuators, thereby controlling steering, acceleration, braking and throttle of the autonomous vehicle 900. The computing device 914 may perform the tasks of localization, 3D mapping, obstacle avoidance, path planning, etc. multiple times per second until the autonomous vehicle 900 reaches the destination. In addition, the computing device 914 may include a data store that stores various types of information, such as road speed limits, traffic accidents, road construction work, etc. The computing device 914 may receive the information from a server via the transceiver 912. The computing device 914 may use the various types of information received from the server for making intelligent decisions when guiding the autonomous vehicle 900 to the destination, In one example, the computing device 914 or a portion of the computing device 914 may be in idle mode (e.g., a low power mode or a standby mode) when the autonomous vehicle 900 is shut off. For example, the computing device 914 may be in idle mode when the autonomous vehicle 900 is parked in a parking space. The computing device 914 may periodically check for messages that are received when the computing device 914 is in idle mode. For example, the computing device 914 may periodically check for messages received from a mobile device. The computing device 914 may transition from idle mode into an on mode upon receiving a message that instructs the autonomous vehicle 900 to perform a task (e.g., drive to a destination). In one configuration, the computing device 914 or the portion of the computing device 914 may be powered via energy harvesting when in idle mode. For example, the computing device 914 may derive energy from external sources in order to receive messages from the device. The external sources may include, but is not limited to, solar power, battery power, thermal power, wind energy, and kinetic energy.

Figure 10:
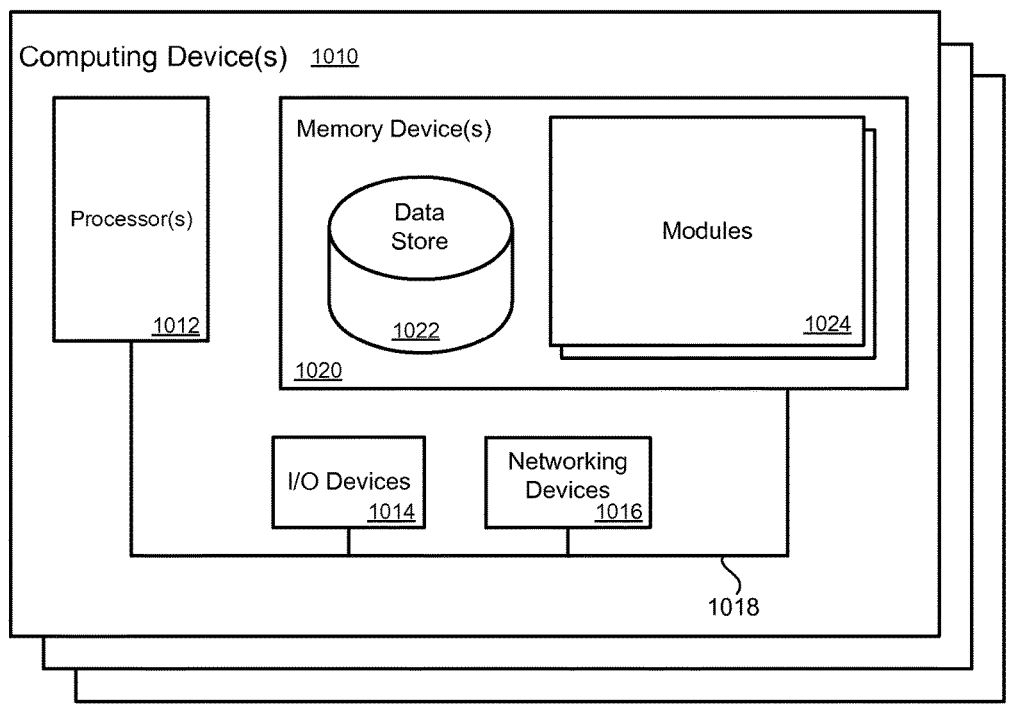
FIG. 10 is a block diagram that provides an example illustration of a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. At least one non-transitory machine readable storage medium having instructions embodied thereon for operating a fleet of autonomous vehicles, the instructions when executed perform the following:
   receiving, using one or more processors, a request for a taxi service from a mobile device, wherein the request includes a current location of the mobile device and indicates that the taxi service is to be performed at a current time;
   estimating an amount of time to perform the taxi service based, in part, on the current location of the mobile device and a drop-off location indicated in the request;
   selecting, using the one or more processors, an autonomous vehicle from the fleet of autonomous vehicles to perform the taxi service based in part on an availability of the autonomous vehicle and a proximity between the autonomous vehicle and the current location of the mobile device, and the autonomous vehicle is selected when the amount of time to perform the taxi service does not conflict with a previously scheduled taxi service for the autonomous vehicle; and
   providing, using the one or more processors, instructions to the autonomous vehicle to perform the taxi service according to the request, wherein the instructions enable the autonomous vehicle to provide commands to drive the autonomous vehicle to the current location of the mobile device in order to perform the taxi service.

2. The at least one non-transitory machine readable storage medium of claim 1, wherein the request for the taxi service includes at least one of: a pickup location, the drop-off location, a number of passengers, or a selected vehicle type.

3. The at least one non-transitory machine readable storage medium of claim 1, further comprising instructions which when executed by the one or more processors performs the following:
   determining an estimated arrival time for the autonomous vehicle to arrive at the current location of the mobile device; and
   sending a confirmation to the mobile device that the autonomous vehicle is to arrive at the current location of the mobile device in order to perform the taxi service and the estimated arrival time.

4. The at least one non-transitory machine readable storage medium of claim 3, further comprising instructions which when executed by the one or more processors performs the following: sending an additional notification with an updated estimated arrival time when the autonomous vehicle is delayed due to road traffic.

5. The at least one non-transitory machine readable storage medium of claim 1, further comprising instructions which when executed by the one or more processors performs the following:
   tracking a location of the autonomous vehicle when the autonomous vehicle is driving to the current location of the mobile device; and
   sending a notification to the mobile device after the autonomous vehicle has arrived at the current location of the mobile device.

6. The at least one non-transitory machine readable storage medium of claim 1, further comprising instructions which when executed by the one or more processors performs the following:
   determining that the autonomous vehicle has completed the taxi service; and
   marking the autonomous vehicle as being available to perform additional taxi services.

7. The at least one non-transitory machine readable storage medium of claim 1, further comprising instructions which when executed by the one or more processors performs the following: instructing the autonomous vehicle to drive to a default parking space after completing the taxi service and wait for instructions to perform an additional taxi service.

8. The at least one non-transitory machine readable storage medium of claim 1, further comprising instructions which when executed by the one or more processors performs the following:
   adding additional taxi services to a schedule associated with the autonomous vehicle; and
   sending the schedule to the autonomous vehicle, wherein the autonomous vehicle is configured to perform the additional taxi services in accordance with the schedule.

9. The at least one non-transitory machine readable storage medium of claim 1, further comprising instructions which when executed by the one or more processors performs the following: maintaining a list of autonomous vehicles that includes, for each autonomous vehicle on the list, a current location of the autonomous vehicle and a taxi schedule associated with the autonomous vehicle.

10. The at least one non-transitory machine readable storage medium of claim 1, further comprising instructions which when executed by the one or more processors performs the following;
   receiving an additional request, from the mobile device, to modify a route associated with the taxi service in route to the drop-off location;
   verifying that the additional request to modify the route does not conflict with a previously scheduled taxi service for the autonomous vehicle; and instructing the autonomous vehicle to perform a modified taxi service in accordance with the additional request from the mobile device.

11. At least one non-transitory machine readable storage medium having instructions embodied thereon for operating a fleet of autonomous vehicles, the instructions when executed perform the following:

receiving, using one or more processors, a request for a taxi service, the request including a pickup location and a selected time for the taxi service;

estimating an amount of time to perform the taxi service at the selected time based, in part, on the pickup location and a drop-off location indicated in the request;

selecting, using the one or more processors, an autonomous vehicle from a fleet of autonomous vehicles that is available to perform the taxi service at the selected time, and the autonomous vehicle is selected when the amount of time to perform the taxi service at the selected time does not conflict with a previously scheduled taxi service for the autonomous vehicle; and adding, using the one or more processors, the taxi service to a schedule associated with the autonomous vehicle, wherein the autonomous vehicle is configured to provide commands to drive the autonomous vehicle to the pickup location at the selected time in accordance with the schedule and perform the taxi service.

12. The at least one non-transitory machine readable storage medium of claim 11, wherein the autonomous vehicle is identified based, in part, on an estimated distance between the autonomous vehicle and the pickup location at the selected time.

13. The at least one non-transitory machine readable storage medium of claim 11, further comprising sending a confirmation to a user indicating that the autonomous vehicle is scheduled to arrive at the pickup location at substantially the selected time.

14. The at least one non-transitory machine readable storage medium of claim 11, further comprising instructions which when executed by the one or more processors performs the following:

tracking a location of the autonomous vehicle when the autonomous vehicle is driving to the pickup location, wherein the autonomous vehicle is configured to use traffic information to determine a starting time for driving to the pickup location in order to arrive at the pickup location at substantially the selected time; and sending a notification to a user after the autonomous vehicle has arrived at the pickup location.

15. An autonomous vehicle, comprising:

a processor;

a memory device including a data store to store a plurality of data and instructions that, when executed by the processor, cause the processor to:

receive instructions to perform a taxi service in accordance with a request for the taxi service, the request indicating a pickup location;

add the taxi service to a schedule of taxi services to be automatically performed by the autonomous vehicle;

select a route for travelling to the pickup location;

provide commands to drive the autonomous vehicle to the pickup location according to the route in order to perform the taxi service;

notify a taxi service system after the taxi service has been completed and the autonomous vehicle is available to perform additional taxi services, as indicated in the schedule of taxi services maintained at the autonomous vehicle; and provide commands to drive the autonomous vehicle to a default parking space after completing the taxi service and wait for instructions from the taxi service system to perform an additional taxi service.

16. The autonomous vehicle of claim 15, wherein the plurality of data and instructions, when executed by the processor, cause the processor to: verify that a user at the pickup location submitted the request for the taxi service before permitting the user to enter into the autonomous vehicle.

17. The autonomous vehicle of claim 15, wherein the plurality of data and instructions, when executed by the processor, cause the processor to: select the route for traveling to the pickup location based on traffic information.

18. The autonomous vehicle of claim 15, wherein the instructions indicate that the taxi service is to be performed at a current time or an upcoming time.

* * * * *